US011582166B2

(12) United States Patent
Duarte et al.

(10) Patent No.: US 11,582,166 B2
(45) Date of Patent: Feb. 14, 2023

(54) SYSTEMS AND METHODS FOR PROVISION OF A GUARANTEED BATCH

(71) Applicant: Google LLC, Mountain View, CA (US)

(72) Inventors: Alexandre Duarte, Milpitas, CA (US); Yingchong Situ, Campell, CA (US); Robert van Gent, Redwood City, CA (US); Walfredo Cime Filho, Palo Alto, CA (US); Ramy Abdelaal, Waterloo (CA); Smeeta Jalan, San Jose, CA (US); Maya Haridasan, San Jose, CA (US)

(73) Assignee: Google LLC, Mountain View, CA (US)

( * ) Notice: Subject to any disclaimer, the term of this patent is extended or adjusted under 35 U.S.C. 154(b) by 173 days.

(21) Appl. No.: 17/339,936

(22) Filed: Jun. 4, 2021

(65) Prior Publication Data
US 2021/0297364 A1 Sep. 23, 2021

Related U.S. Application Data

(63) Continuation of application No. 16/717,967, filed on Dec. 17, 2019, now Pat. No. 11,032,212, which is a
(Continued)

(51) Int. Cl.
*H04L 12/911* (2013.01)
*H04L 12/24* (2006.01)
(Continued)

(52) U.S. Cl.
CPC ............ *H04L 47/78* (2013.01); *G06F 9/5005* (2013.01); *G06F 9/5027* (2013.01);
(Continued)

(58) Field of Classification Search
CPC ...................... H04L 12/00; H04L 12/14; H04L 12/1432–1439; H04L 41/00; H04L 41/08; H04L 41/0803; H04L 41/0813; H04L 41/0816; H04L 41/085; H04L 41/14–147; H04L 41/50; H04L 41/5009–5016;
(Continued)

(56) References Cited

U.S. PATENT DOCUMENTS 8,621,476 B2 * 12/2013 Youn ..................... G06F 9/5061
718/104
9,430,280 B1 * 8/2016 Shih ...................... G06F 9/5005
(Continued)

FOREIGN PATENT DOCUMENTS

WO WO 2016/165969 A1 * 10/2016

*Primary Examiner* — Boris D Grijalva Lobos
(74) *Attorney, Agent, or Firm* — Honigman LLP; Brett A. Krueger (57) ABSTRACT

Systems and methods for providing a guaranteed batch pool are described, including receiving a job request for execution on the pool of resources; determining an amount of time to be utilized for executing the job request based on available resources from the pool of resources and historical resource usage of the pool of resources; determining a resource allocation from the pool of resources, wherein the resource allocation spreads the job request over the amount of time; determining that the job request is capable of being executed for the amount of time; and executing the job request over the amount of time, according to the resource allocation.

20 Claims, 10 Drawing Sheets

Related U.S. Application Data continuation of application No. 15/677,916, filed on Aug. 15, 2017, now Pat. No. 10,541,939.

(51) Int. Cl.
| | |
|---|---|
| *G06F 9/50* | (2006.01) |
| *H04L 47/78* | (2022.01) |
| *H04L 41/5009* | (2022.01) |
| *H04L 41/14* | (2022.01) |
| *H04L 41/147* | (2022.01) |
| *H04L 41/50* | (2022.01) |
| *H04L 43/55* | (2022.01) |

(52) U.S. Cl.
CPC ............ *G06F 9/5061* (2013.01); *H04L 41/14* (2013.01); *H04L 41/147* (2013.01); *H04L 41/50* (2013.01); *H04L 41/5009* (2013.01); *H04L 43/55* (2022.05)

(58) Field of Classification Search
CPC ..... H04L 41/5038; H04L 47/00; H04L 47/50; H04L 47/56; H04L 47/468; H04L 47/70; H04L 47/78; G06F 9/46; G06F 9/50; G06F 9/5005; G06F 9/5027; G06F 9/5038; G06F 9/5061; G06F 2209/5011
See application file for complete search history.

(56) References Cited

U.S. PATENT DOCUMENTS

| | | | |
|---|---|---|---|
| 2009/0025004 A1* | 1/2009 | Barnard | G06F 9/50 718/104 |
| 2013/0247058 A1* | 9/2013 | Sirdey | G06F 9/46 718/102 |
| 2017/0109199 A1* | 4/2017 | Chen | G06F 9/5027 |
| 2018/0041442 A1* | 2/2018 | Jones-McFadden | H04L 41/0896 |

* cited by examiner

| User ID | Budget | Commitments | Historical | Job Requests |
|---|---|---|---|---|
| USER1 | BUD1 | COM1 | HIS1 | JOB1, JOB2, JOB3... |
| USER2 | BUD2 | COM2 | HIS2 | NONE |
| USER3 | BUD3 | COM3 | HIS3 | JOB4, JOB5,... |
| ... | ... | ... | ... | ... |

FIG. 3(a)

| Resource Type | Time Period | Commitments | Historical | Expected |
|---|---|---|---|---|
| RTYPE1 | TIM1 | RCOM1 | RHIS1 | EXP1 |
| RTYPE2 | TIM2 | RCOM2 | RHIS2 | EXP2 |
| RTYPE3 | TIM3 | RCOM3 | RHIS3 | EXP3 |
| ... | ... | ... | ... | ... |

FIG. 3(b)

| Job Request ID | Tasks | Resource allocation | Constraints |
|---|---|---|---|
| JOB1 | TASK1, TASK2, ... | RES1 | CON1 |
| JOB2 | TASK3 | RES2 | CON2 |
| JOB3 | TASK4, TASK5... | RES3 | CON3 |
| .... | .... | .... | .... |

Columns labeled 304-1, 304-2, 304-3, 304-4.

SYSTEMS AND METHODS FOR PROVISION OF A GUARANTEED BATCH

CROSS REFERENCE TO RELATED APPLICATIONS

This U.S. Patent Application is a continuation of, and claims priority under 35 U.S.C. § 120 from, U.S. patent application Ser. No. 16/717,967, filed on Dec. 17, 2019, which is a continuation of U.S. patent application Ser. No. 15/677,916, filed on Aug. 15, 2017. The disclosures of these prior application are considered part of the disclosure of this application and are hereby incorporated by reference in their entireties.

TECHNICAL FIELD

The subject matter discussed herein relates generally to systems and methods for resource allocation and management, and more particularly, to system and methods for provision of a guaranteed batch.

BACKGROUND

There are several related art implementations for scheduling optimizations for distributed computing systems. For example, related art implementations provide algorithms for optimizing scheduling to improve fairness, user satisfaction, and utilization. Related art implementations can also utilize deep learning to improve the packing of tasks with multiple resource requirements.

Another advancement in the related art involve budget based scheduling. Related art implementations can involve schedulers for workflows with deadline and/or budget guarantees using genetic algorithms. Other related art implementations may attempt to allocate resources based on the user Quality of Service (QoS) constraints, namely deadline and budget.

Related art implementations have also involved dynamic cloud implementations. In an example related art implementation, there is a service level agreement (SLA) aware platform for resource management. There are related art implementations that involve a learning system that can make explicit Service Level Objectives (SLOs) based on historical data of periodic jobs and enforces such SLOs using scheduling algorithms.

SUMMARY

Example implementations described herein are directed to systems and methods to allocate resources for an intermittent load. The example implementations may involve a per user budget-based resource allocation that can obviate the need to provide deadline or load presence information on a per job basis.

The subject matter includes a computer-implemented method for managing a pool of resources, which can involve receiving a job request for execution on the pool of resources; determining an amount of time to be utilized for executing the job request based on available resources from the pool of resources and historical resource usage of the pool of resources; determining a resource allocation from the pool of resources, wherein the resource allocation spreads the job request over the amount of time; determining that the job request is capable of being executed for the amount of time; and executing the job request over the amount of time, according to the resource allocation.

The subject matter further includes a non-transitory computer readable medium, storing instructions for managing a pool of resources, the instructions which can involve receiving a job request for execution on the pool of resources; determining an amount of time to be utilized for executing the job request based on available resources from the pool of resources and historical resource usage of the pool of resources; determining a resource allocation from the pool of resources, wherein the resource allocation spreads the job request over the amount of time; determining that the job request is capable of being executed for the amount of time; and executing the job request over the amount of time, according to the resource allocation.

The subject matter further includes a system configured to manage a pool of resources, the system which can involve a processor, configured to receive a job request from the pool of resources; determine an amount of time to be utilized for executing the job request based on available resources from the pool of resources and historical resource usage of the pool of resources; determine a resource allocation from the pool of resources, wherein the resource allocation spreads the job request over the amount of time; determine that the job request is capable of being executed for the amount of time; and execute the job request over the amount of time, according to the resource allocation.

The subject matter also includes a system for managing a pool of resources, the system which can involve means for receiving a job request for execution on the pool of resources; means for determining an amount of time to be utilized for executing the job request based on available resources from the pool of resources and historical resource usage of the pool of resources; means for determining a resource allocation from the pool of resources, wherein the resource allocation spreads the job request over the amount of time; means for determining that the job request is capable of being executed for the amount of time; and means for executing the job request over the amount of time, according to the resource allocation.

The methods are implemented using one or more computing devices and/or systems. The methods may be stored in computer-readable media such as a non-transitory computer readable medium.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for provision of a guaranteed batch. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Cloud infrastructures workloads can often be broadly classified, in terms of their presence in the system, as either continuous or intermittent. Continuous workloads are involve workloads that are present in the system all the time and usually include both user-facing (latency-sensitive) server applications as well as continuous background (latency-tolerant) data-processing systems (i.e. data compression, web crawling/indexing).

Intermittent workloads are workloads that are characterized by varying periods of absence intercalated by periods of activity, where resources are actually required/consumed. This group mostly encompasses intermittent background data-processing systems (i.e. logs processing, simulations).

Load presence can be important for efficient resource management. Continuous workloads require continuous resource allocation, consuming a certain (usually varying over a determined interval) amount of resources for 24 hours/day. Variability in the consumption usually leads to waste as resources must be provisioned for the peak load. Cloud providers rely on different availability Service Level Objectives (SLO) to meet the user requirements without hurting the overall fleet efficiency.

Intermittent workloads can be seen as an special class of continuous workloads with extreme consumption variability conditions (from 0 to peak). Therefore, continuous resource allocation can also be used for intermittent workloads, but such allocations can be very wasteful for intermittent workloads. Furthermore, the availability SLOs associated with continuous resource allocations are usually not as meaningful for intermittent workloads as they are to continuous workloads, especially when the ratios between presence and absence periods approach zero.

Intermittent resource allocation, where resources are reserved for a given user for a pre-defined period and freed for the remaining time, is the solution to avoid increasing resource idleness time. Unfortunately, intermittent resource allocation is much harder to achieve than continuous resource allocation because it puts an extra burden on the users, requiring them to specify not only the required amount of resources but also when and for how long these resources will actually be needed, and on the provider, that must keep a complex scheduling of multiple intermittent resource allocations in order to be able decide on the feasibility of new user requests.

In related art implementations, large cloud infrastructures address intermittent load by using reclaimed resources. In these cases, the intermittently available resources are usually much cheaper than their continuous counterparts in exchange to providing none or, at least, very weak SLOs.

Example implementations described herein are directed to a resource management model to allocate resources for intermittent load, or batch load, that relies on per user budgets and which may obviate the need for information regarding job duration or deadlines. Example implementations as described herein utilize a novel definition of a user budget, representing the maximum amount of resources a user can consume over a fixed period of time, hence, defined using a RESOURCE*TIME unit (e.g., CPU*HOURS, BYTES*HOUR, and so on).

Example implementations described herein can be applied to cloud providers and other companies with large distributed computing infrastructures attending multiple individual or groups of users to improve utilization/efficiency on the computing clusters.

Figure 1A:
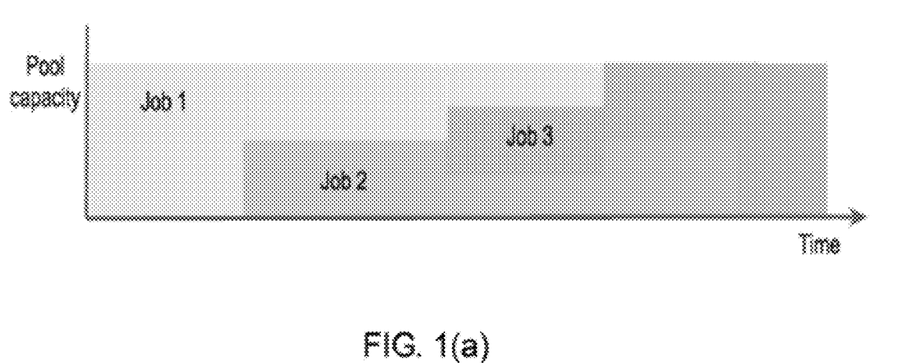
FIGS. 1(a) and 1(b) illustrate examples of resource multiplexing in accordance with an example implementation.
Figure 1B:
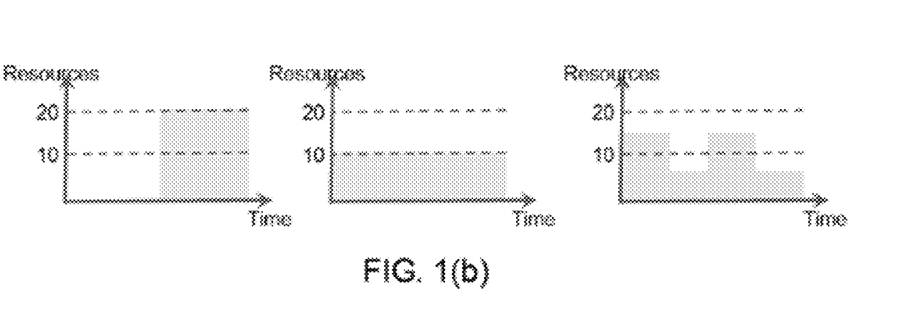

FIGS. 1(a) and 1(b) illustrate an example of resource multiplexing in accordance with an example implementation. As illustrated in FIG. 1(a), example implementations described herein time multiplex resources by transforming the shape of jobs to fit in the capacity of the system. There is a high probability that at peak times, not all admitted jobs will fit into the capacity of the pool. To handle such situations, example implementations may disable individual tasks within jobs as needed to ensure that the SLOs of all admitted jobs are met. Disabled tasks can be marked on the user interface (UI) as "Disabled Due To Congestion" and such terminations will not count towards user configured failure limits for the job/task. In example implementations, jobs running in best effort mode will be sized down or disabled completely, as necessary. If the system is still congested, jobs with guarantees which are farther away from their expected deadline (e.g., creation time+24 hours) will be squeezed before the ones which are closer to make sure that no collection guarantees would be violated.

In the example of FIG. 1(b), as users are assigned a guaranteed batch in terms of RESOURCE*TIME, the ceiling/commitment of the user is considered as an average throughput over a period of time (e.g., 24 hours). So, a commitment of Y resources means that the user may be able to consume, on average, Y units of this resource over the next period of time. The guaranteed batch workload may exceed Y when more resources are available and may be squeezed during contention. For example, if a user has a commitment of ten resources (e.g., Central Processing Units (CPUs), memory units, etc.) and is using it all for a guaranteed batch, examples of the possible job consumption patterns are shown for FIG. 1(b). Note that the resource usages over time (area of shaded area) are exactly the same in all there cases.

Figure 2:
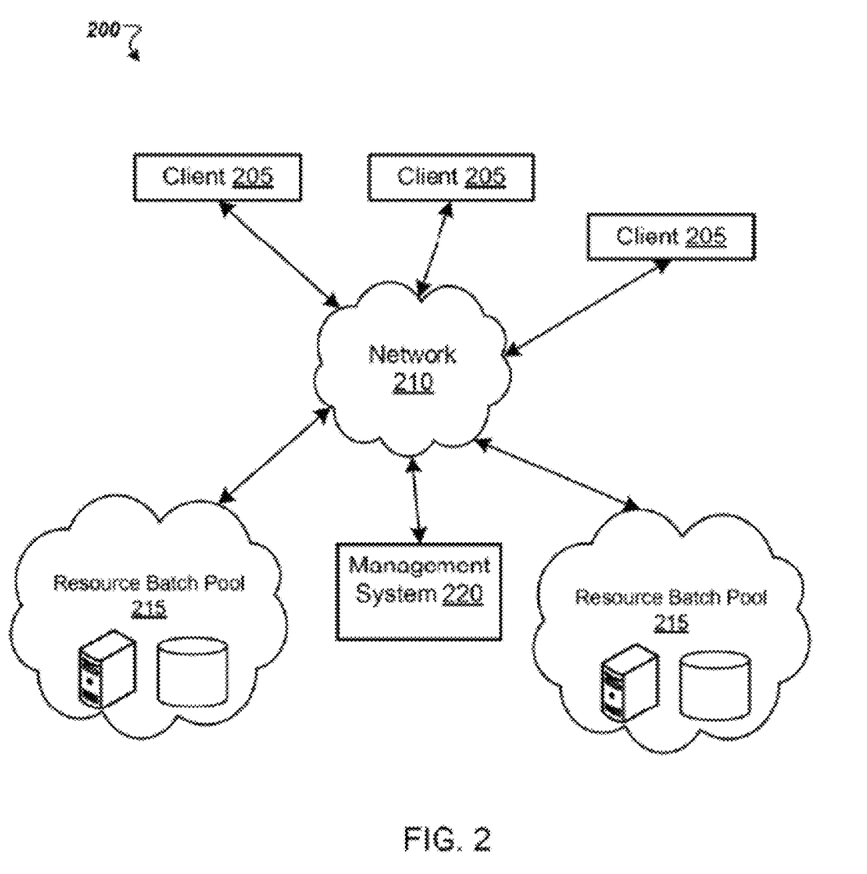
FIG. 2 illustrates an example cloud environment, in accordance with an example implementation.

FIG. 2 illustrates an example cloud environment 200, in accordance with an example implementation. In an example implementation, the cloud environment 200 can include one or more client devices 205, a network 210, one or more resource batch pools 215 and a management system 220. The one or more client devices 205 execute one or more jobs on resources allocated from the one or more resource batch pools 215, and may access such resources through network 210. Examples of such client devices 205 are provided with respect to FIG. 5. Network 210 may be configured to facilitate connections between the one or more client devices 205, the one or more resource batch pools 215 and the management system 220. Such a network 210 may be in the form of a Local Area Network (LAN), a Wide Area Network (WAN), or otherwise depending on the desired implementation. The one or more resource batch pools 215 may be implemented in the form of a cloud including any combination of dedicated central processing units (CPUs), storage systems, memory units, general processing units (GPUs), servers, and other hardware units that are configured to provide desired resources for the one or more client devices 205. Resources that can be provided can include, but are not limited to, CPUs, memory, bandwidth, specialized processors, and so on according to the desired implementation.

In example implementations, the one or more resource batch pools 215 may be managed by a management system 220. Management system 220 can be configured to receive requests for a resource allocation for a job from the one or more client devices 205, and then manage the allocation of resources from the resource batch pools 215 for the one or more clients 205 based on the example implementations described herein.

In example implementations, a batch pool is utilized as an entity holding the resources available for users with batch load as illustrated by the resource batch pool 215 of FIG. 2, and provides a pool of resources for use. The capacity from a given batch pool is obtained by blocking computing resources for a specified amount of time $\Delta t$, hence defined as RESOURCE*HOUR/$\Delta t$. Such a batch pool provides different products (CPU, memory, disk, etc). The capacity of each batch product p, bcp, expressed in RESOURCE*HOUR/period of time $\Delta t$ units, is defined in terms of the capacity allocated from the underlying continuous product for the period $\Delta t$, ccp, as:

$$bcp = (ccp * \Delta t) \quad (1)$$

For example, a pool administrator can fund a batch pool by allocating 1000 RESOURCE units of a continuous product p, over a period of time (e.g., 24 hours). The resulting capacity of the equivalent Batch product would be:

$$bcp = (1000*24) \text{ or } 24000 \text{ RESOURCE*HOURs/DAY}$$

The batch pool capacity can be defined as the integral of the instantaneous capacity allocated from the underlying continuous product p at any moment t, ccp(t), over a period of time $\Delta t$.

$$bc_p = \int_{t-\Delta t}^{t} cc_p(t) dt \quad (2)$$

Using this definition the 24000 RESOURCE*HOURs/DAY batch capacity mentioned in the previous example could be obtained both by allocating 1000 RESOURCE units for 24 hours or 2000 RESOURCE units for 12 hours over a period of 24 hours, for example.

Similarly, the fraction of the batch pool capacity allocated for a particular user, the user commitments, over a period of time $\Delta t$ can be expressed as:

$$bc_{up} = \int_{t-\Delta t}^{t} cc_{up}(t) dt \quad (3)$$

In the example implementations, users initially start with the same commitments (e.g., 0) and have the number adjusted periodically according to their past consumption. Note that such a definition does not imply any particular bound on the instantaneous capacity of the underlying continuous product at any moment t.

Batch Pool capacity (bcp) and Batch User Commitments (bcup) are concepts valid over a period of time $\Delta t$ and no assumptions should be made about the underlying instantaneous values at any particular instant t.

In example implementations, the proposed resource allocation mode can provide two SLOs for users with intermittent load. In a first SLO, users with enough load will be able to consume their entire budget (in this case, commitments) over a period $\Delta t$. In a second SLO, the downtime for any job j, dj, over a period of time $\Delta t$ won't exceed the maximum specified downtime D.

Define the submitted load, sl, as all of the load a user submits to a batch pool and admitted load, al, as the amount of the sl admitted by the batch scheduler to run under an SLO. In an example implementation, users can submit jobs that specify the required resources to start running the job and the maximum downtime the job can take, D. In such an example, the first SLO can be utilized by enforcing the following two inequalities during resource allocation:

$$\forall t, \int_{t-\Delta t}^{t} al_{pu}(t) dt \geq \text{MIN}\left(bc_{pu}, \int_{t-\Delta t}^{t} sl_{pu}(t) dt\right) \quad (4)$$

$$\forall t, al_{pu}(t) \leq sl_{pu}(t) \quad (5)$$

Inequality (4) specifies that for every moment t the admitted load for user u over the last $\Delta t$ period of time is the minimum of the commitments and the submitted load. That is, if submitted load≤commitments, all submitted load is admitted by the system. On the contrary, if commitments<submitted load, only load amounting to the commitments will be accepted to receive the SLO.

Inequality (5) is a control mechanism to prevent allocating more resources than the user can actually consume at any moment t. The second SLO imposes a constraint on how long jobs can be delayed and can be obtained with job prioritization according to the remaining user budget over $\forall t$.

Based on the equations above, the proposed criteria C(u) to identify the user u to have the next job released is:

$$C = \text{MAX}\left(0, bc_{pu} - \int_{t-\Delta t}^{t} cc_{pu}(t) dt\right)$$

The user with the greatest C(u) is ahead of the queue. For a given user, the jobs are dequeued in first in first out (FIFO) order.

Figure 3A:
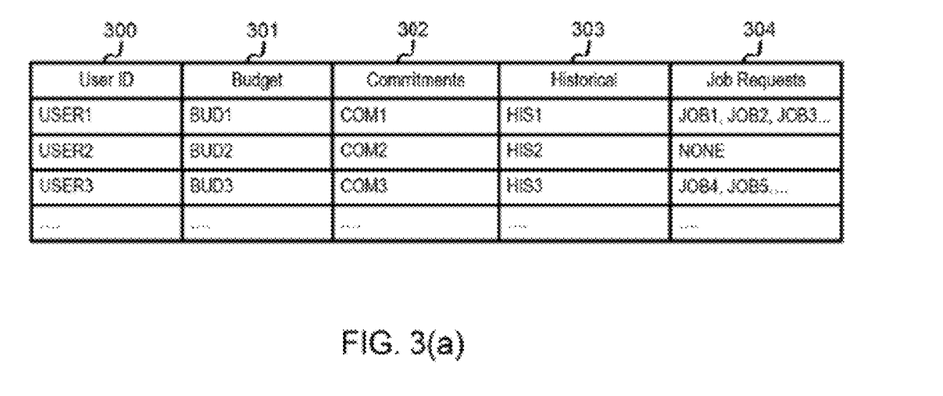
FIGS. 3(a) to 3(c) illustrate example management information that can be utilized by the management system, in accordance with an example implementation.

FIG. 3(a) illustrates example management information as utilized by the management system, in accordance with an example implementation. Specifically, FIG. 3(a) illustrates example management information for management of resource allocation for one or more users. The management information of FIG. 3(a) facilitates the management system 220 to manage the resource budget for each user of a plurality users of the pool of resources through managing resource allocation to one or more client devices associated with each user based on the resource budget associated with each user. As the client devices may involve multiple different users, or as a user may utilize multiple client devices to execute various jobs, resource budgets can be managed at a user level as described below.

The management information as illustrated in FIG. 3(a) can include user identifiers (IDs) 300, an associated resource allocation budget 301, present resource commitments 302, and historical resource usage 303. The user ID 300 can indicate the identification of the user that has job requests running on the resource batch pools 215. The resource allocation budget 301 can be represented as a vector across all of the different types of resources available in the resource batch pools 215, with each element in the vector indicative of the amount of available resources for the particular type of resource. Such resources can be represented as RESOURCE*TIME, with the time based on the time period associated with the type of resource, and calculated based on equation (3). The present resource commitments can include the jobs presently executed by the user and the resources consumed, as illustrated in FIG. 1(b). The present resource commitments 302 may also include a vector across all of the different types of resources available in the resource batch pools 215, with each element in the vector indicative of the amount of resources consumed for the particular type of resource. Such values can be determined from the summation of the areas of the resources utilized over time for each type of resource for each job as illustrated in FIG. 1(b). Historical resource usage 303 can include the jobs historically executed by the user and the associated historical resource usage or consumption as illustrated in FIG. 1(b). Once jobs are completed for the user, the job can be moved from the present resource commitments 302 to the historical resource usage 303.

Figure 3B:
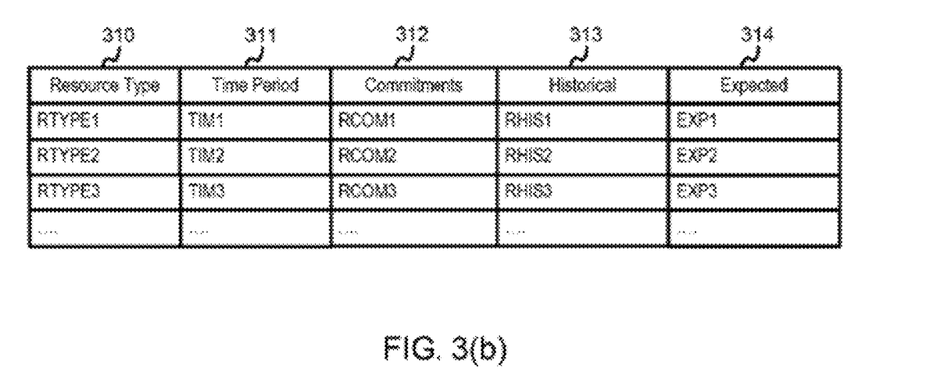
Figure 3C:
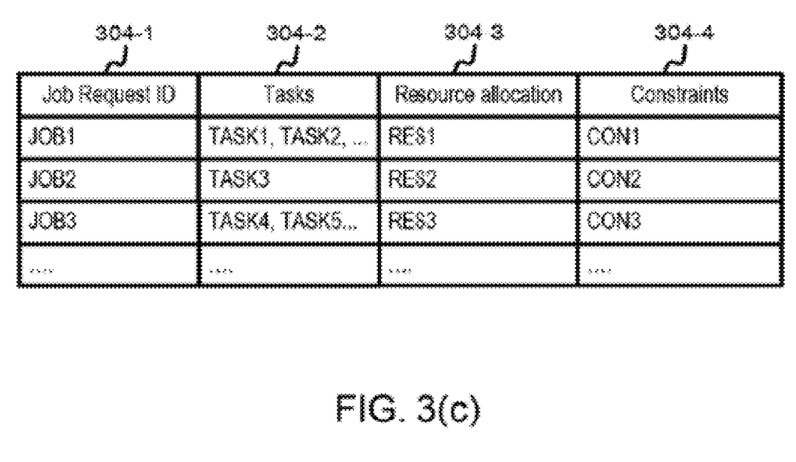

FIG. 3(b) illustrates example management information for management of the pool of resources for the one or more resource batch pools 215, in accordance with an example implementation. Such management information can include types of resources 310, time period for each type of resource 311, current resource commitments for the type of resource 312, historical resource usage 313, and expected resource commitments 314. Types of resources 310 can include the type of resource available for resource batch pools 215, such as storage and central processing units (CPUs) provided from a cloud pool, GPUs, bandwidth, or other resources depending on the desired implementation, as well as the total resources for the type of resource in the resource batch pool 215 (e.g., the batch pool capacity for the type of resource calculated from equation (2)). Time period for each type of resource 311 can include the set time period (e.g., 24 hours) for each of the resources, and the unit of time associated with the resource type (e.g., 1 hour), to define the resource availability in terms of RESOURCE*TIME. The time period and unit of time can be set by an administrator or though other methods in accordance with the desired implementation. Current resource commitments 312 can include the job information as illustrated in FIG. 1(b) across all users of the resource batch pool 215 that utilize the particular type of resource. Current resource commitments 312 can also include a value indicating how much of the particular type of resource is consumed in terms of RESOURCE*TIME. Historical resource usage 313 can include the job information as illustrated in FIG. 1(b) from all of the jobs that utilize the particular type of resource. When a job in the current resources commitments is completed, such job information can be moved to the historical resource usage 313. Expected resource commitments 314 can include information as illustrated in FIG. 1(b) that is calculated based on historical resource usage 313. Such a calculation can be conducted by taking an average of resources consumed for each time unit for a time period, or through other methods depending on the desired implementation.

FIGS. 4(a) to 4(d) illustrate examples of process implementations that can be executed by the management system, in accordance with an example implementation.

Figure 4A:
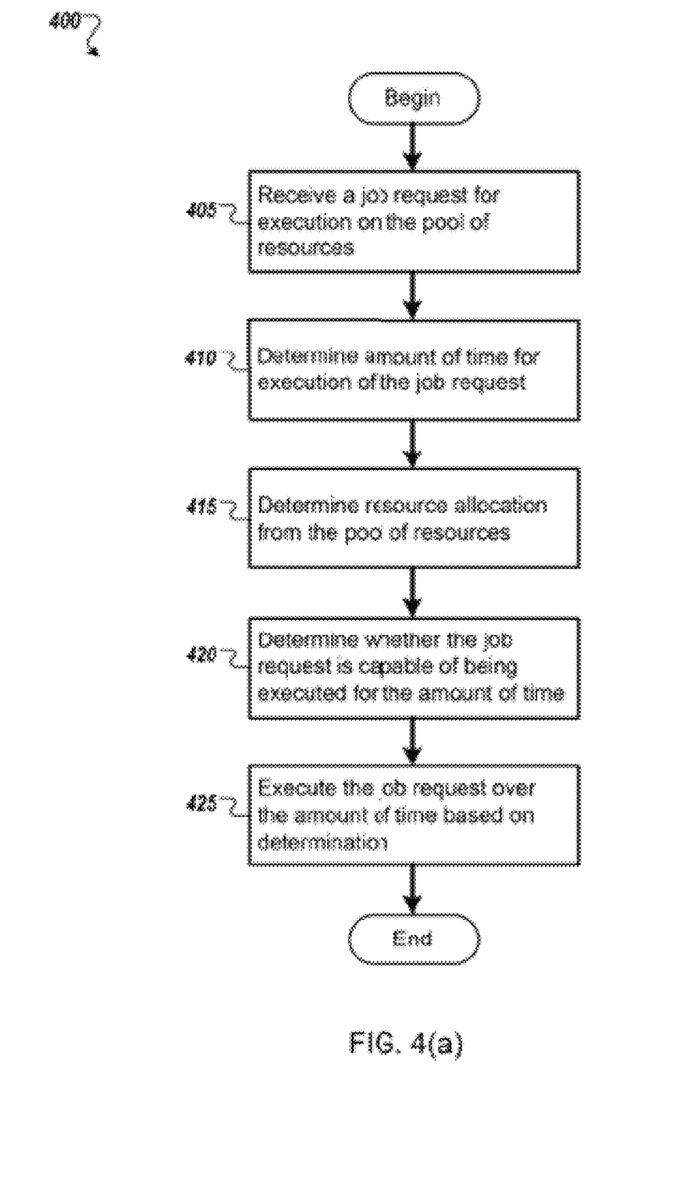
FIGS. 4(a) to 4(d) illustrate examples of process implementations that can be executed by the management system, in accordance with an example implementation.

FIG. 4(a) illustrates an example of a process implementation 400, in accordance with an example implementation. The process 400 of FIG. 4 illustrates an example for a process for the flow at FIG. 2. At 405, the process receives a job request for execution on the pool of resources. Such a request may be received from the one or more clients 205 by the management system 220. Such a job request can involve a request of at least one of processing, memory, bandwidth, GPUs or specialized processors, and so on, depending on the desired implementation.

At 410, the process determines the amount of time utilized for execution of the job request. The process can refer to the available resources from the pool of resources and historical usage data of the pool of resources from FIG. 3(b). In an example, the available units of resource time can be determined for the resource batch pool 215 based on the available resources from the pool of resources (e.g., total resource units associated with a type of resource from FIG. 3(b)) and the estimated resource commitments over one or more units of time based on historical resource usage 313 of the pool of resources as indicated in estimated resource commitments of FIG. 3(b). The available units of resource time can be determined from the difference between the total resource units the estimated resource commitments. Similarly, available units of resource time for a user ID associated with the job request is determined based on a resource allocation budget assigned to the user associated with the job request and resource commitments of the user associated with the job request as indicated in FIG. 3(a). The available units of resource time can be determined from the difference between the budget and the resource commitments.

Figure 4B:
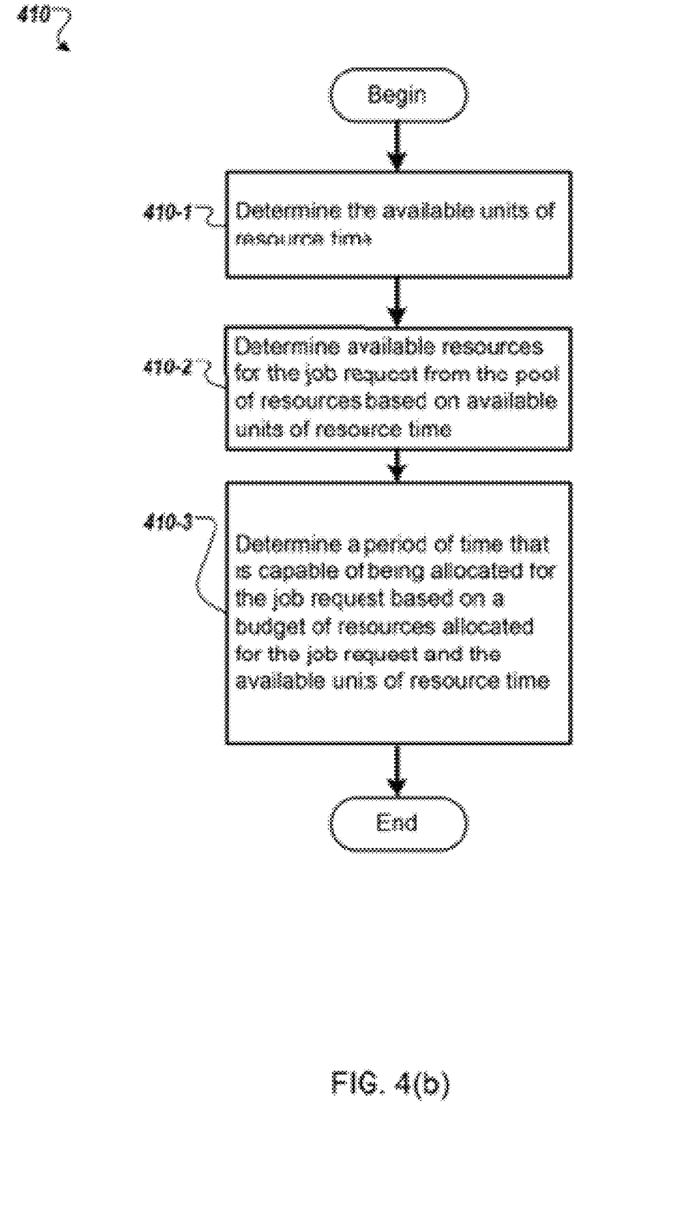
Figure 4C:
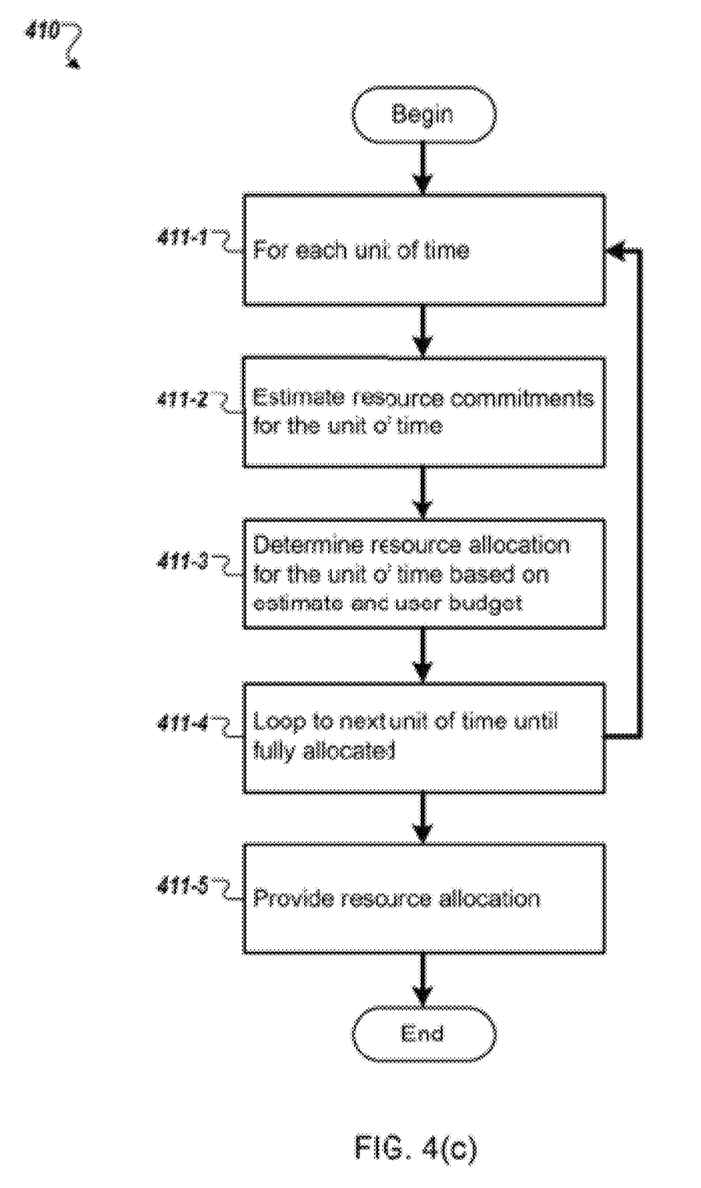

At 415, the process determines resource allocation from the pool of resources based on the amount of time utilized for the job request. Depending on the present resource commitments of the user associated with the request and the expected resource commitments 314 over the time period, an allocation is determined as illustrated in FIGS. 1(a) and 1(b). As illustrated in FIG. 4(c), the determining the resource allocation can involve a process that for each unit of time, determines the resource allocation for the each unit of time based on a budget associated with the job request and available resources from the pool of resources for the each period of time. As illustrated in FIG. 4(b), the determining the resource allocation from the pool of resources can also involve, for each unit of time, determining the resource allocation for the job request based on the estimated available resources for the each unit of time.

Depending on the desired implementation, queuing is also applied for the resource allocation. The resource allocation from the pool of resources is determined based on the queuing of the user from the plurality of the users associated with the job request, and the other expected commitments received from other users, based on the proposed criteria C(u). In conjunction with the example implementations described in FIGS. 4(b) and 4(c), the resource allocation can be conducted for each unit of time while taking queuing into account. For example, for each unit of time, the process can estimate the queuing of the user associated with the job request based on the proposed criteria C(u); and estimate resource commitments of users from the plurality of users ahead of the user associated with the job request in the queue.

At 420, the process determines whether the job request is capable of being executed for the amount of time. That is, a check is performed to determine if the proposed amount of time to execute the job request meets with the SLO requirement of the job request or the user, and/or if the resource request is valid.

At 425, should the process determine that the job request is capable of being executed for the amount of time, the process executes the job request over the amount of time according to the resource allocation. The executing the job request can involve, for each unit of time in the amount of time, allocating resources from the pool of resources according to the determined resource allocation corresponding to the each unit of time, as illustrated in FIG. 1(a).

Depending on the desired implementation, queuing may be employed for the received plurality of requests. In such an example implementation, the process manages the resource budget for each of the users as illustrated in FIG. 3(a), and determines the queuing order for the job requests based on the user associated with the job request. The queuing is determined based on resource commitments of the plurality of users and the resource budget for the each user of the plurality of users as described with respect to the proposed criteria C(u).

FIG. 4(b) illustrates a process for determining the amount of time to be utilized for executing the job request, in accordance with an example implementation. The process beings by, for each unit of time, determining the available units of resource time at 410-1. At 410-2, the process then determines available resources for the job request from the pool of resources based on available units of resource time from referring to management information of FIGS. 3(a) and 3(b). Through reference to the management information as illustrated in FIGS. 3(a) and 3(b), the available resources from the pool of resources can be determined and the process can estimate resource commitments over one or more units of time based on historical resource usage 313 of the pool of resources. For example, the resource commitments of the user can be estimated based on the historical resource usage 313 of the resource batch pool 215 as described with respect to the expected resource commitments 314 of FIG. 3(b), and the process can estimate the available resources from the pool of resources from the estimated resource commitments, which can involve taking the difference between the total resources available and the estimated resource commitments.

At 410-3, the process then determines a period of time that is capable of being allocated for the job request based on a budget of resources allocated for the job request and the available units of resource time.

FIG. 4(c) illustrates an example flow for determining the period of time for a job request and conducting the resource allocation at 415. Specifically, FIG. 4(c) illustrates an example process for the flow of 410 and 415 for FIG. 4(c), as an example flow for determining the period of time that is capable of being allocated for the job request based on a budget of resources allocated for the job request and the available units of resource time comprises. At 411-1, a loop is initiated for each unit of time, the unit of time defined by the time period set in the management information of FIG. 3(b). At 411-2, the process estimates the resource commitments for the unit of time. The estimation can be referenced from the estimation of resource commitments from the management information of FIG. 3(b).

At 411-3, a resource allocation is determined for the unit of time. Such a resource allocation can be determined based on the resource commitments of the user associated with the job request for the each unit of time and a resource allocation budget assigned to the user associated with the job request for the each unit of time from referring to the present commitments of the user ID associated with the job request, the budget for the user ID, the total resources for the type of resource in the resource batch pool 215, and the current and expected commitments for that type of resource from the management information of FIGS. 3(a) and 3(b).

The current and expected commitments for that type of resource is subtracted from the total resources to determine the expected available resources for the unit of time. Similarly, the present user commitments are subtracted from the user budget to determine the expected resources available to the user for that time unit. If the user can consume the resource budget (e.g., expected resources available to the user<expected available resources for the unit of time), then resources up to the expected resources available to the user are allocated as indicated in equations (4) and (5). Otherwise, the allocation is done based on the SLO policy as indicated in equation (5).

At 411-5, after all of the allocation is completed, the amount of time units utilized is determined from the resource allocation as the period of time to be associated with the job request, and the proposed resource allocation is provided.

Figure 4D:
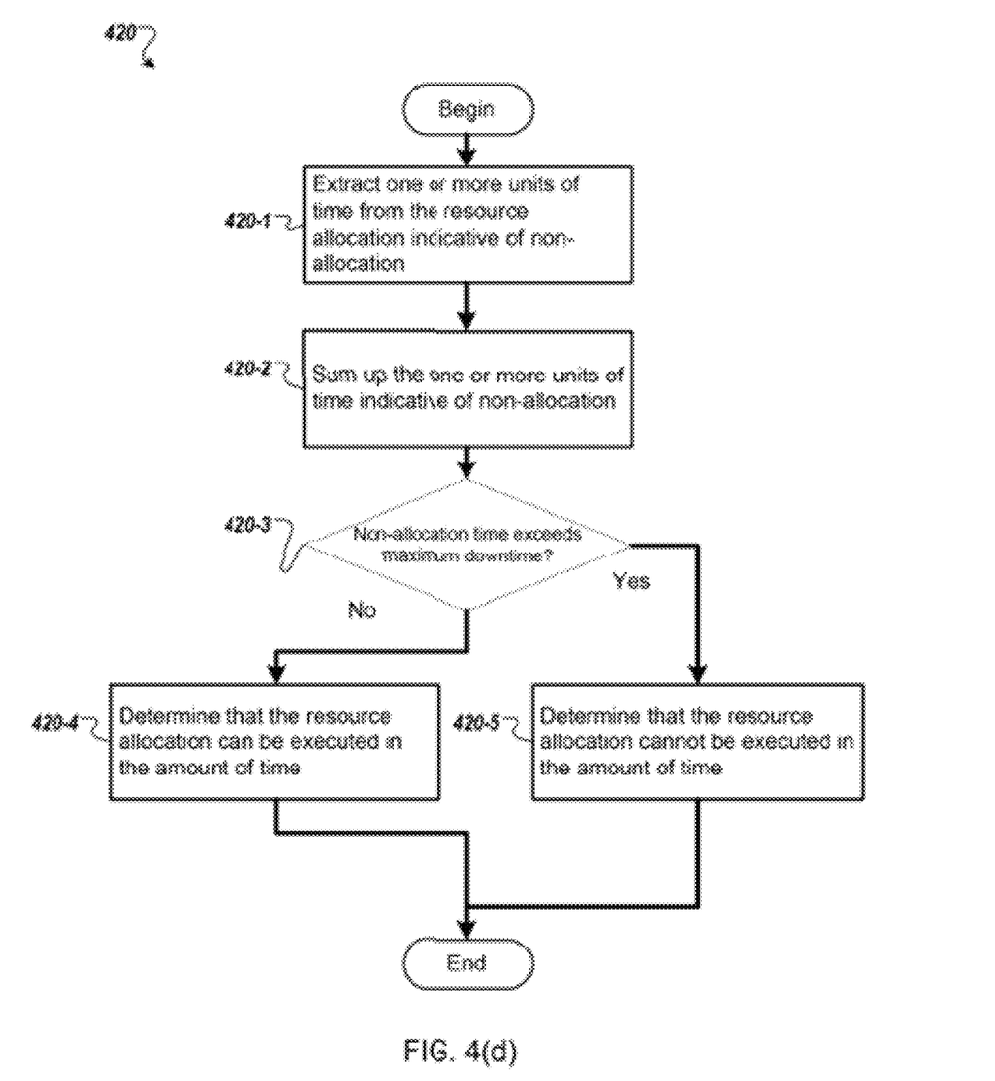

FIG. 4(d) illustrates example process for evaluating whether the determined period of time is acceptable. Such a process can be utilized at the process of 420. In an example as to whether the determined period of time is acceptable, one method is to determine whether a downtime associated with the resource allocation does not exceed the maximum downtime associated with the job request.

At 420-1, the process extracts one or more units of time from the resource allocation indicative of non-allocation (e.g., when zero resources are allocated for that particular time unit). At 420-2, the process sums up the one or more units of time that are indicative of non-allocation to determine the estimated downtime. At 420-3, a determination is made as to whether the non-allocation time (estimated downtime) exceeds the maximum downtime. For the downtime not exceeding the maximum downtime (No), the process proceeds to 420-4 and determines that the resource allocation can be executed in the amount of time, therefore capable of being executed. Otherwise, for the downtime exceeding the maximum downtime (Yes), the flow proceeds to 420-5 and determines that the job request is not capable of being executed.

Other methods can be utilized in conjunction with, or separately from FIG. 4(d) to determine if the proposed period of time and resource allocation is acceptable. Such a determination can be made based on whether or not the SLOs as described above are met. The job request may be associated with a time requirement, so the determination can be based on whether the amount of time to be utilized for executing the job request meets a time requirement associated with the job request. Another example for a determination whether the job request is capable of being executed for the amount of time can be based on whether the proposed resource allocation can be executed (e.g., is invalid or not due to violating constraints associated with present job commitments, other users, and so on).

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Figure 5:
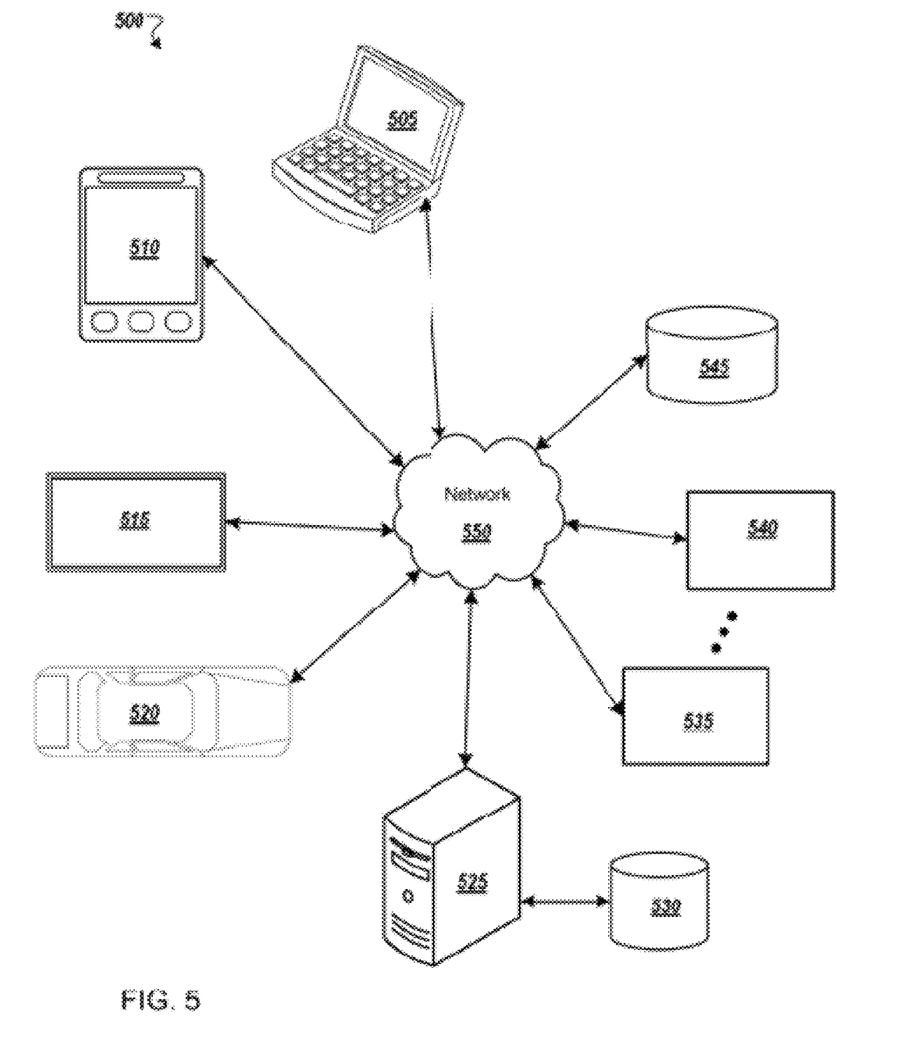
FIG. 5 shows an example environment suitable for some example implementations.

FIG. 5 shows an example environment suitable for some example implementations. Environment 500 includes devices 505-545, and each is communicatively connected to at least one other device via, for example, network 550 (e.g., by wired and/or wireless connections). Some devices may be communicatively connected to one or more storage devices 530 and 545. Such devices 505-545 can be examples of client devices 205, or can also be a device utilized to facilitate the functionality of the management system 220.

An example of one or more devices 505-545 may be computing device 605 described below in FIG. 6. Devices 505-545 may include, but are not limited to, a computer 505 (e.g., a laptop computing device), a mobile device 510 (e.g., smartphone or tablet), a television 515, a device associated with a vehicle 520, a server computer 525, computing devices 535-540, storage devices 530 and 545.

Figure 6:
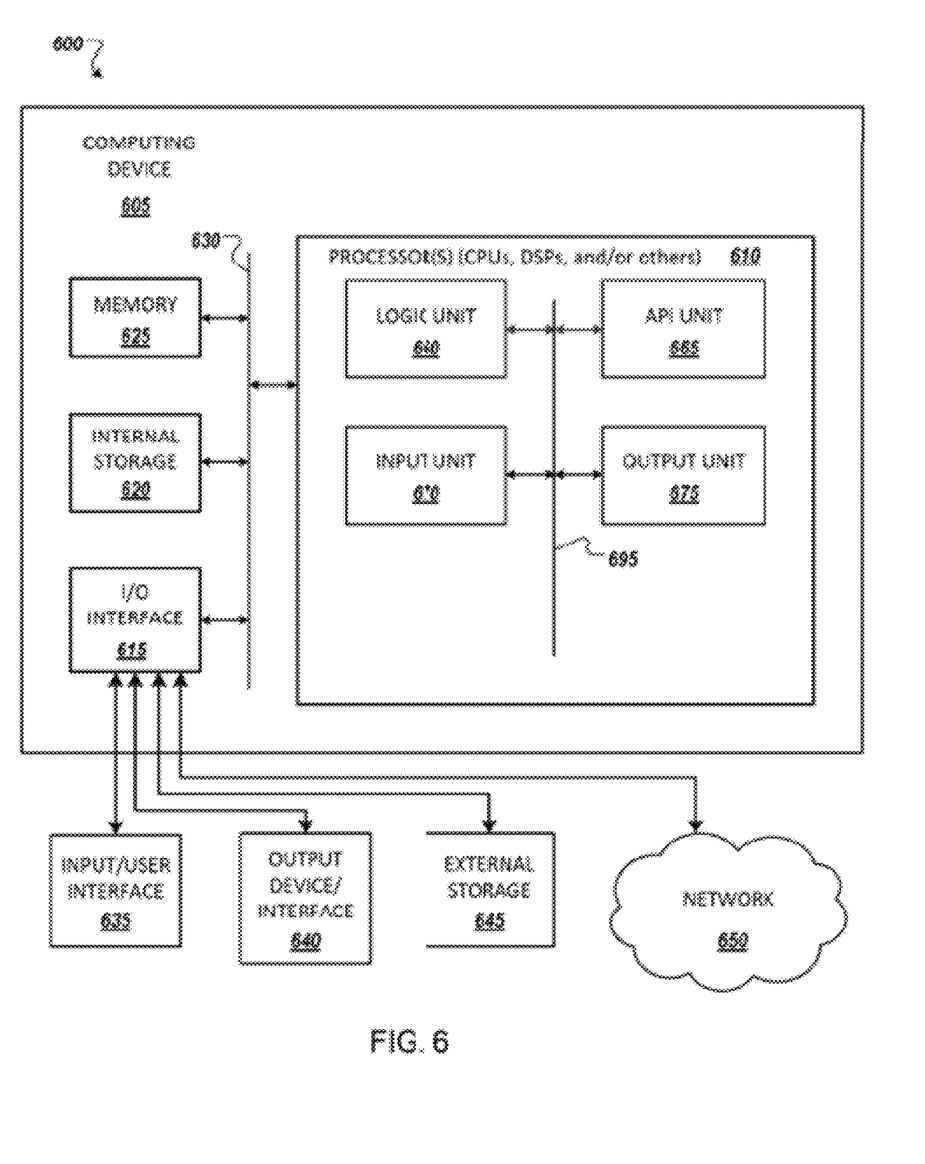
FIG. 6 shows an example computing environment with an example computing device suitable for use in some example implementations.

FIG. 6 shows an example computing environment with an example computing device suitable for use in some example implementations, such as management system 220 or client devices 205. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computing device 605. In other example implementations, other computing devices may function as or provide the functions of input/user interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

The I/O interface 625 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided.

In an example implementation of a management system 220, external storage 645 may be configured to store the management information as illustrated in FIGS. 3(a) and 3(b), and processor(s) 610 may be configured to execute the functions as depicted in FIGS. 4(a) to 4(d).

In some example implementations, when information or an execution instruction is received by API unit 665, it may be communicated to one or more other units (e.g., logic unit 660, input unit 670, and output unit 675.

In some instances, logic unit 660 may be configured to control the information flow among the units and direct the services provided by API unit 665, input unit 670, and output unit 675, in some example implementations described above. For example, the flow of one or more processes or implementations may be controlled by logic unit 660 alone or in conjunction with API unit 665.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method when executed on data processing hardware causes the data processing hardware to perform operations, the operations comprising:
   receiving a request initiated by a user to execute a list of tasks on computing resources in a computing environment;
   determining a resource allocation budget uniquely associated with the user, the resource allocation budget representing a maximum amount of computing resources the user can consume from the computing environment;
   determining resource commitments associated with the user, the resource commitments corresponding to consumed computing resources executing one or more tasks;
   identifying, from the computing environment, computing resources available to the user based on:
      the determined resource allocation budget uniquely associated with the user; and
      the resource commitments associated with the user; and
   allocating the identified computing resources available to the user to execute the list of tasks.

2. The computer-implemented method of claim 1, wherein the resource allocation budget comprises a maximum amount of central processing units (CPUs).

3. The computer-implemented method of claim 1, wherein allocating the identified computing resources comprises transitioning the request from a submitted state to an admitted state, the admitted state indicating that the list of tasks are ready to execute on the identified computing resources available to the user.

4. The computer-implemented method of claim 1, wherein the list of tasks of the request comprises a specification that indicates dependencies for one or more of the tasks in the list of tasks.

5. The computer-implemented method of claim 4, wherein the dependencies define a concurrent run process for two or more of the tasks in the list of tasks.

6. The computer-implemented method of claim 4, wherein the dependencies define a consecutive run process for two or more of the tasks in the list of tasks.

7. The computer-implemented method of claim 4, wherein the dependencies define a disablement priority for at least one task in the list of tasks.

8. The computer-implemented method of claim 1, wherein the operations further comprise determining that the list of tasks are capable of being executed for an amount of time identified by a time requirement associated with the request.

9. The computer-implemented method of claim 1, wherein the operations further comprise:
   determining a downtime associated with the request;
   determining whether the downtime exceeds a maximum downtime for the request; and
   when the downtime does exceed the maximum downtime for the request, determining that the request is not capable of being executed.

10. The computer-implemented method of claim 1, wherein allocating the identified computing resources available to the user is based on historical resource usage for tasks previously executed by the user.

11. A system comprising:
   data processing hardware; and
   memory hardware in communication with the data processing hardware, the memory hardware storing instructions that when executed on the data processing hardware cause the data processing hardware to perform operations comprising:
      receiving a request initiated by a user to execute a list of tasks on computing resources in a computing environment;
      determining a resource allocation budget uniquely associated with the user, the resource allocation budget representing a maximum amount of computing resources the user can consume from the computing environment;
      determining resource commitments associated with the user, the resource commitments corresponding to consumed computing resources executing one or more tasks;
      executing one or more tasks;
      identifying, from the computing environment, computing resources available to the user based on:
         the determined resource allocation budget uniquely associated with the user; and
         the present current resource commitments associated with the user; and
      allocating the identified computing resources available to the user to execute the list of tasks.

12. The system of claim 11, wherein the resource allocation budget comprises a maximum amount of central processing units (CPUs).

13. The system of claim 11, wherein allocating the identified computing resources comprises transitioning the request from a submitted state to an admitted state, the admitted state indicating that the list of tasks are ready to execute on the identified computing resources available to the user.

14. The system of claim 11, wherein the list of tasks of the request comprises a specification that indicates dependencies for one or more of the tasks in the list of tasks.

15. The system of claim 14, wherein the dependencies define a concurrent run process for two or more of the tasks in the list of tasks.

16. The system of claim 14, wherein the dependencies define a consecutive run process for two or more of the tasks in the list of tasks.

17. The system of claim 14, wherein the dependencies define a disablement priority for at least one task of the list in tasks.

18. The system of claim 11, wherein the operations further comprise determining that the list of tasks are capable of being executed for an amount of time identified by a time requirement associated with the request.

19. The system of claim 11, wherein the operations further comprise:
   determining a downtime associated with the request;
   determining whether the downtime exceeds a maximum downtime for the request; and
   when the downtime does exceed the maximum downtime for the request, determining that the request is not capable of being executed.

20. The system of claim 11, wherein allocating the identified computing resources available to the user is based on historical resource usage for tasks previously executed by the user.

* * * * *